(12) United States Patent
Miyazaki

(10) Patent No.: US 9,061,548 B2
(45) Date of Patent: Jun. 23, 2015

(54) RUBBER COMPOSITION FOR TIRE, AND PNEUMATIC TIRE

(75) Inventor: Tatsuya Miyazaki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 13/451,677

(22) Filed: Apr. 20, 2012

(65) Prior Publication Data
US 2012/0267026 A1    Oct. 25, 2012

(30) Foreign Application Priority Data

Apr. 22, 2011   (JP) .................................. 2011-096562
Nov. 29, 2011   (JP) .................................. 2011-260893

(51) Int. Cl.
| | | |
|---|---|---|
| B60C 9/18 | (2006.01) | |
| B60C 15/06 | (2006.01) | |
| C08K 3/06 | (2006.01) | |
| C08L 9/00 | (2006.01) | |
| C08L 45/02 | (2006.01) | |
| B60C 1/00 | (2006.01) | |
| C08L 7/00 | (2006.01) | |

(52) U.S. Cl.
CPC .......... B60C 1/0016 (2013.04); Y10T 152/1081 (2015.01); B60C 2009/2061 (2013.04); B60C 2001/0058 (2013.04); C08L 7/00 (2013.01); B60C 2001/0033 (2013.04); Y02T 10/862 (2013.01)

(58) Field of Classification Search
CPC ............. C08L 9/00; C08L 9/06; C08L 45/02; C08K 3/06; B60C 9/18; B60C 15/06
USPC .................... 524/418, 482, 549; 152/537, 541
See application file for complete search history.

(56) References Cited

U.S. PATENT DOCUMENTS

5,901,766 A *   5/1999   Sandstrom et al. ........... 524/270
2007/0167557 A1 * 7/2007 Dumke et al. ................ 524/495

FOREIGN PATENT DOCUMENTS

| JP | 2001-81243 A | 3/2001 |
|---|---|---|
| JP | 2006-124601 A | 5/2006 |
| JP | 2010-111753 A | 5/2010 |
| JP | 2011-219540 A | 11/2011 |
| JP | 2011-246565 A | 12/2011 |

OTHER PUBLICATIONS

JP2011-219540—machine translation—Tatsuya Miyazaki.*
JP2011-219540—machine translation—Tatsuya Miyazaki—published Nov. 4, 2011.*

* cited by examiner

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

The invention provides a rubber composition for a tire, and a pneumatic tire that are capable of achieving both good fuel economy and a good elongation at break. The rubber composition for a tire according to the invention includes a rubber component containing an isoprene-based rubber; sulfur; and a coumarone-indene resin having a softening point of $-20°$ C. to $45°$ C., wherein the coumarone-indene resin is contained in an amount of 0.5 to 20 parts by mass per 100 parts by mass of the rubber component.

4 Claims, No Drawings

RUBBER COMPOSITION FOR TIRE, AND PNEUMATIC TIRE

TECHNICAL FIELD

The invention relates to a rubber composition for a tire, and to a pneumatic tire using the same.

BACKGROUND ART

In the case of dissolving, in a polymer, sulfur commonly used in rubber compositions for tires (e.g. breaker toppings, base treads, clinches, sidewalls and inserts), since the sulfur has an S8 structure and also has about the same degree of polarity as ethylene glycol, it is generally difficult to uniformly disperse the sulfur in natural rubber, butadiene rubber or styrene-butadiene rubber each of which has a low polarity.

To address this problem, some approaches which reduce the amount of S8 by employing, for example, a sulfur-containing hybrid crosslinking agent (1,6-bis(N,N'-dibenzylthiocarbamoyldithio)hexane) or an alkylphenol-sulfur chloride condensate have been proposed. However, sulfur-containing hybrid crosslinking agents are generally expensive, and alkylphenol-sulfur chloride condensates have a poor dispersibility themselves, thereby deteriorating the elongation at break and abrasion resistance.

A relatively large amount of sulfur is compounded in steel cord-covering rubber compositions for the sake of adhesion to cords, but because most of the sulfur is present as poorly dispersed agglomerates and does not participate in crosslinking, the crosslink density between polymers becomes nonuniform, as a result of which the elongation at break tends to decrease markedly. Accordingly, there exists a need for a compounded rubber in which sulfur is uniformly dispersed to achieve an excellent elongation at break.

Good performances such as handling stability and fuel economy are desired in all tire components. For example, the use of a tin-modified butadiene rubber having a strong bonding force to filler in order to improve fuel economy while maintaining the handling stability has been proposed.

Yet, the improvements in elongation at break and fuel economy achieved by the above techniques still leave something to be desired. Further advances in the form of significant improvements in both of these performances while maintaining the handling stability have been sought. For example, Patent Document 1 discloses improvements in performances such as grip performance using a specific styrene-butadiene rubber and coumarone-indene resin, but does not investigate improvements in fuel economy and elongation at break.

Patent Document 1: JP 2006-124601 A

SUMMARY OF THE INVENTION

It is therefore an object of the invention to provide a rubber composition for a tire which resolves the above problems and achieves both good fuel economy and a good elongation at break. A further object of the invention is to provide a pneumatic tire using such a rubber composition.

Accordingly, the invention provides a rubber composition for a tire which includes a rubber component containing an isoprene-based rubber; sulfur; and a coumarone-indene resin having a softening point of −20° C. to 45° C., wherein the coumarone-indene resin is contained in an amount of 0.5 to 20 parts by mass per 100 parts by mass of the rubber component.

The sulfur is preferably contained in an amount of 0.5 to 7 parts by mass per 100 parts by mass of the rubber component.

It is preferable that the coumarone-indene resin is contained in an amount of 0.5 to 10 parts by mass and the sulfur is contained in an amount of 1.3 to 7 parts by mass, per 100 parts by mass of the rubber component.

The rubber composition is preferably a rubber composition for a breaker topping, a base tread, a sidewall, a clinch, a tie gum, a bead apex or a sidewall reinforcing layer.

The invention additionally provides a pneumatic tire produced with the foregoing rubber composition.

The rubber composition for a tire of the present invention includes an isoprene-based rubber, sulfur and a given amount of a coumarone-indene resin having a specific softening point, and therefore is able to achieve both good fuel economy and a good elongation at break.

BEST MODE FOR CARRYING OUT THE INVENTION

The inventive rubber composition for a tire includes a given amount of a coumarone-indene resin having a softening point of −20° C. to 45° C. in addition to an isoprene-based rubber and sulfur. Such a composition markedly improves elongation at break and fuel economy while maintaining the handling stability, and is thus able to improve these performances while achieving a good balance therebetween. The reason for this is not entirely clear, but is thought to be as follows.

Although uniformly dispersing sulfur in a low-polarity isoprene-based rubber is difficult, by including a coumarone-indene resin having a specific softening point, the resin and sulfur (in particular, the oxygen atoms included in the coumarone-indene resin and the sulfur) are mutually attracted by van der Waals forces, so that the surface of the sulfur becomes coated by the resin, lowering the surface energy of the sulfur (lowering the cohesive force). As a result, the difference in solubility parameters (SP) between the surface of the sulfur and the isoprene-based rubber becomes smaller, promoting dispersion of the sulfur. In addition, owing to the good dispersibility of the resin itself and the slipperiness conferred to the polymer chains, the sulfur uniformly disperses throughout the rubber composition in the mixing step. Therefore, because crosslinking between polymers becomes uniform in the vulcanization step, both the fuel economy and elongation at break are improved while at the same time maintaining a good handling stability, in addition to which excellent durability is obtained. Moreover, other performances such as adhesion to steel cords and abrasion resistance also become good.

Examples of the isoprene-based rubber include natural rubber (NR), isoprene rubber (IR) and liquid isoprene rubber (L-IR). No particular limitation is imposed on the NR, and NRs commonly employed in the tire industry, such as SIR20, RSS#3 and TSR20, can be used. Nor is any limitation imposed on the IR, and IRs commonly employed in the tire industry can be used. Among these, the use of NR is preferred from the standpoint of obtaining good fuel economy and a good elongation at break.

In the rubber composition for a tire, the content of the isoprene-based rubber in 100% by mass of the rubber component is preferably 10% to 100% by mass. Within this range, good fuel economy and a good elongation at break can be obtained.

In the case of a rubber composition for a breaker topping, the content of the isoprene-based rubber in 100% by mass of the rubber component is preferably at least 70% by mass, more preferably at least 90% by mass, and even more preferably 100% by mass. At less than 70% by mass, a sufficient elongation at break may not be obtained.

In the case of a rubber composition for a base tread, the content of the isoprene-based rubber in 100% by mass of the rubber component is preferably at least 20% by mass, and more preferably at least 50% by mass. At less than 20% by mass, a sufficient elongation at break may not be obtained. This content is preferably not more than 90% by mass, and more preferably not more than 70% by mass. At more than 90% by mass, sufficient fuel economy tends not to be obtained.

In the case of a rubber composition for a sidewall or a sidewall-reinforcing layer (sidewall inner layer-reinforcing layer), the content of the isoprene-based rubber in 100% by mass of the rubber component is preferably at least 10% by mass, and more preferably at least 30% by mass. At less than 10% by mass, sufficient rubber strength may not be obtained. This content is preferably not more than 70% by mass, and more preferably not more than 60% by mass. At more than 70% by mass, a sufficient flex crack growth resistance tends not be obtained.

Illustrative, non-limiting, examples of rubbers other than the isoprene-based rubber which may be contained in the rubber component in the invention include diene rubbers such as styrene-butadiene rubber (SBR), butadiene rubber (BR), acrylonitrile-butadiene rubber (NBR), chloroprene rubber (CR), butyl rubber (IIR) and styrene-isoprene-butadiene copolymer rubber (SIBR). Of these, from the standpoint of obtaining good fuel economy, elongation at break, handling stability and durability in a balanced manner, SBR and BR are preferred in the case of rubber compositions for a base tread or a sidewall inner layer-reinforcing layer, whereas BR is preferred in the case of rubber compositions for a sidewall.

The SBR is not subject to any particular limitation, although to obtain a high level of fuel economy and a high elongation at break, preferred use can be made of an SBR modified by a compound represented by formula (1) below as described in JP 2010-111753 A.

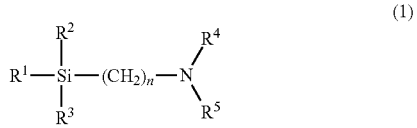
(1)

(In the formula, $R^1$, $R^2$ and $R^3$ may be the same or different and each represent an alkyl group, alkoxy group (an alkoxy group having preferably 1 to 8 carbons, more preferably 1 to 6 carbons, and even more preferably 1 to 4 carbons), silyloxy group, acetal group, carboxyl group (—COOH), mercapto group (—SH) or derivative thereof; $R^4$ and $R^5$ may be the same or different and each represent a hydrogen atom or an alkyl group (an alkyl group preferably having 1 to 4 carbons); and n is an integer (preferably 1 to 5, more preferably 2 to 4, and even more preferably 3)).

$R^1$, $R^2$ and $R^3$ are each preferably an alkoxy group, and $R^4$ and $R^5$ are each preferably a hydrogen atom. In this way, a high level of fuel economy and a high elongation at break can be obtained.

Illustrative examples of the compound of formula (1) include 3-aminopropyltrimethoxysilane, 3-aminopropyltriethoxysilane, 3-aminopropyldimethylmethoxysilane, 3-aminopropylmethyldimethoxysilane, 2-dimethylaminoethyltrimethoxysilane, 3-diethylaminopropyltrimethoxysilane and 3-dimethylaminopropyltrimethoxysilane. These may be used singly or as a combination of two or more thereof.

Examples of methods which may be used to modify styrene-butadiene rubber with a compound (modifier) of above formula (1) include known methods such as those described in JP H6-53768 B, JP H6-57767 B, and JP 2003-514078 T. Illustrative examples include methods which are capable of modifying styrene-butadiene rubber by bringing it into contact with the modifier, such as a method which prepares a styrene-butadiene rubber by anionic polymerization, then adds a given amount of a modifier to the rubber solution and effects a reaction between the polymerizing end (active end) of the styrene-butadiene rubber and the modifier.

To obtain good handling stability, the bound styrene content of SBR is preferably at least 5% by mass, and more preferably at least 8% by mass. On the other hand, to obtain good fuel economy, the bound styrene content is preferably not more than 21% by mass, and more preferably not more than 13% by mass.

In this invention, the styrene content of SBR is determined by $^1$H-NMR measurement.

In the case of a rubber composition for a base tread, the content of SBR in 100% by mass of the rubber component is preferably at least 5% by mass, and more preferably at least 10% by mass. At less than 5% by mass, the above-described improving effects by SBR may not be adequately obtained. This content is preferably not more than 50% by mass, and more preferably not more than 30% by mass. At more than 50% by mass, a sufficient elongation at break and flex crack growth resistance may not be obtained.

In the case of a rubber composition for a sidewall inner layer-reinforcing layer, the content of SBR in 100% by mass of the rubber component is preferably at least 5% by mass, and more preferably at least 25% by mass. At less than 5% by mass, sufficient stability of physical properties at high temperatures and sufficient reversion resistance may not be obtained during deflated operation. This content is preferably not more than 60% by mass, and more preferably not more than 45% by mass. At more than 60% by mass, the heat build-up tends to be greater.

The BR is not subject to any particular limitation, although from the standpoint of obtaining good fuel economy, flex crack growth resistance, elongation at break, handling stability and durability in a balanced manner, a tin-modified BR polymerized using a lithium initiator and having a tin atom content of 50 to 3,000 ppm, a vinyl content of 5% to 50% by mass, and a molecular weight distribution of 2 or less is preferred in the case of rubber compositions for a base tread. Also, from a similar standpoint, a BR containing 1,2-syndiotatic polybutadiene crystals (SPB-containing BR) is preferred in the case of rubber compositions for a sidewall or a sidewall inner layer-reinforcing layer.

The tin-modified BR may be obtained by carrying out 1,3-butadiene polymerization with a lithium initiator, and then adding a tin compound. It is more preferable for the end of the tin-modified BR molecule to have a tin-carbon bond.

Examples of the lithium initiator include lithium compounds such as alkyl lithium and aryl lithium. Examples of the tin compound include tin tetrachloride and butyltin trichloride.

The tin-modified BR has a tin atom content of at least 50 ppm. At less than 50 ppm, tan δ tends to increase. The tin atom content is not more than 3,000 ppm, and preferably not more than 300 ppm. At more than 3,000 ppm, the extrusion processability of the kneaded mixture tends to deteriorate.

The molecular weight distribution (Mw/Mn) of the tin-modified BR is 2 or less. When Mw/Mn is more than 2, tan δ tends to increase. There is no particular lower limit in the molecular weight distribution, although a value of 1 or more is preferred.

In this specification, the weight-average molecular weight (Mw) and number-average molecular weight (Mn) can be determined relative to polystyrene standards based on measured values obtained with a gel permeation chromatograph (GPC) (GPC-8000 series from Tosoh Corporation; detector: differential refractometer; column: TSKGEL SUPERMALT-PORE HZ-M from Tosoh Corporation).

The vinyl content of the tin-modified BR is at least 5% by mass. At less than 5% by mass, the production of tin-modified BR is difficult. The vinyl content is not more than 50% by mass, and preferably not more than 20% by mass. At more than 50% by mass, the carbon black dispersibility tends to be poor and the tensile strength tends to decrease.

The vinyl content may be measured by infrared absorption spectrometry.

The SPB-containing BR used may be a product commonly used in the tire industry. However, to achieve the above performances well, it is preferable for the 1,2-syndiotactic polybutadiene crystals to be chemically bonded with BR and dispersed.

The melting point of the 1,2-syndiotactic polybutadiene crystals is preferably at least 180° C., and more preferably at least 190° C., but preferably not more than 220° C., and more preferably not more than 210° C. Below the lower limit, the handling stability improving effect by the SPB-containing BR may not be obtained sufficiently, whereas above the upper limit, the processability tends to deteriorate.

In the SPB-containing BR, the content of 1,2-syndiotactic polybutadiene crystals (boiling n-hexane insolubles content) is preferably at least 2.5% by mass, and more preferably at least 10% by mass. At less than 2.5% by mass, the reinforcing effect (E*) and the flex crack growth resistance may be inadequate. This content is preferably not more than 20% by mass, and more preferably not more than 18% by mass. At more than 20% by mass, the processability tends to deteriorate.

In the case of a rubber composition for a base tread, the BR content in 100% by mass of the rubber component is preferably at least 5% by mass, and more preferably at least 10% by mass. At less than 5% by mass, the above-described improving effects by BR may not be sufficiently achieved. This content is preferably not more than 50% by mass, and more preferably not more than 30% by mass. At more than 50% by mass, a sufficient elongation at break may not be achieved.

In the case of a rubber composition for a sidewall, the BR content in 100% by mass of the rubber component is preferably at least 30% by mass, and more preferably at least 40% by mass. At less than 30% by mass, the above-described improving effects by BR may not be sufficiently achieved. This content is preferably not more than 80% by mass, and more preferably not more than 70% by mass. At more than 80% by mass, a sufficient elongation at break and a sufficient tear strength may not be achieved.

In the case of a rubber composition for a sidewall inner layer-reinforcing layer, the BR content in 100% by mass of the rubber component is preferably at least 5% by mass, and more preferably at least 20% by mass. At less than 5% by mass, the above-described improving effects by BR may not be sufficiently achieved. This content is preferably not more than 60% by mass, and more preferably not more than 40% by mass. At more than 60% by mass, the high-temperature durability during deflated operation may not be adequate.

Examples of the sulfur include powdered sulfur, precipitated sulfur, colloidal sulfur, insoluble sulfur and highly dispersible sulfur.

In the inventive rubber composition for a tire, the sulfur content per 100 parts by mass of the rubber component is preferably at least 0.5 parts by mass, and more preferably at least 1.3 parts by mass, but preferably not more than 7 parts by mass, and more preferably not more than 6 parts by mass. Within the above range, excellent fuel economy and elongation at break can be obtained.

In the case of a rubber composition for a breaker topping or a sidewall inner layer-reinforcing layer, to obtain excellent fuel economy, elongation at break and adhesion, the sulfur content is preferably 4 to 7 parts by mass per 100 parts by mass of the rubber component.

The rubber composition of the invention includes a coumarone-indene resin having a softening point of −20° C. to 45° C. The coumarone-indene resin is a resin containing coumarone and indene as the monomer components making up the resin skeleton (main chain). Monomer ingredients other than coumarone and indene which may be incorporated into the skeleton are, for example, styrene, α-methylstyrene, methylindene and vinyltoluene.

The softening point of the coumarone-indene resin is at least −20° C., and preferably at least −10° C. At below −20° C., the fuel economy and elongation at break may not be sufficiently improved. The softening point is not more than 45° C., and preferably not more than 40° C. At more than 45° C., the fuel economy and elongation at break tend to deteriorate.

The softening point of coumarone-indene resin, which is measured as set forth in JIS K 6220-1:2001 with a ring and ball softening point apparatus, is the temperature at which the ball drops down.

In the rubber composition for a tire, the content of the coumarone-indene resin having the softening point specified above per 100 parts by mass of the rubber component is at least 0.5 parts by mass, and preferably at least 1 part by mass. At less than 0.5 parts by mass, the fuel economy and elongation at break may not be sufficiently improved. This content is not more than 20 parts by mass, preferably not more than 10 parts by mass, and more preferably not more than 5 parts by mass. At more than 20 parts by mass, the hardness tends to be inadequate, as a result of which the handling stability tends to deteriorate.

The rubber composition of the invention may include other coumarone-indene resins. Of these, from the standpoint of obtaining a good grip, elongation at break, handling stability, and processability, including a coumarone-indene resin having a softening point of 70° C. to 120° C. is preferred. To achieve these performances well in a balanced manner, the content of the coumarone-indene resin having a softening point of 70° C. to 120° C. per 100 parts by mass of the rubber component is preferably 0.5 to 8 parts by mass.

The rubber composition of the invention preferably includes carbon black. This enables a good reinforcing effect to be obtained and makes it possible to obtain, for example, excellent abrasion resistance, durability, handling stability, and resistance to ultraviolet degradation.

In the case of a rubber composition for a breaker topping, the nitrogen adsorption specific surface area ($N_2SA$) of the carbon black is preferably at least 40 m$^2$/g, and more preferably at least 70 m$^2$/g. At less than 40 m$^2$/g, a sufficient elongation at break may not be obtained. The $N_2SA$ is preferably not more than 200 m$^2$/g, and more preferably not more than 90 m$^2$/g. At more than 200 m$^2$/g, it may not be possible to achieve sufficient fuel economy.

In the case of a rubber composition for a bead tread, a sidewall or a sidewall inner layer-reinforcing layer, the nitrogen adsorption specific surface area ($N_2SA$) of the carbon black is preferably at least 30 m²/g. At less than 30 m²/g, it may not be possible to obtain a sufficient elongation at break. The N₂SA is preferably not more than 100 m²/g, and more preferably not more than 50 m²/g. At more than 100 m²/g, it may not be possible to obtain sufficient fuel economy.

The N₂SA of carbon black may be determined in accordance with JIS K 6217-2:2001.

In the case of a rubber composition for a breaker topping, the carbon black content per 100 parts by mass of the rubber component is preferably at least 20 parts by mass, and more preferably at least 50 parts by mass. At less than 20 parts by mass, sufficient hardness and elongation at break may not be attainable. This content is preferably not more than 100 parts by mass, and more preferably not more than 70 parts by mass. At more than 100 parts by mass, sufficient fuel economy may not be attainable.

In the case of a rubber composition for a base tread, the carbon black content per 100 parts by mass of the rubber component is preferably at least 3 parts by mass. At less than 3 parts by mass, a sufficient reinforcing effect may not be attainable. This content is preferably not more than 50 parts by mass, and more preferably not more than 10 parts by mass. At more than 50 parts by mass, sufficient fuel economy may not be attainable.

In the case of a rubber composition for a sidewall or a sidewall inner layer-reinforcing layer, the carbon black content per 100 parts by mass of the rubber component is preferably at least 20 parts by mass, and more preferably at least 30 parts by mass. At less than 20 parts by mass, sufficient hardness and elongation at break may not be attainable. This content is preferably not more than 80 parts by mass, and more preferably not more than 60 parts by mass. At more than 80 parts by mass, sufficient fuel economy may not be attainable.

The rubber composition of the invention may include silica, and the inclusion of silica is preferable particularly in the case of rubber compositions for a base tread, breaker topping or sidewall. When silica is used (particularly when silica is used in an amount of at least 15 parts by mass per 100 parts by mass of the rubber component), to promote dispersion of the silica, it is preferably used together with a known silane coupling agent.

In the case of a rubber composition for a base tread, the silica has a nitrogen adsorption specific surface area (N₂SA) of preferably at least 50 m²/g, and more preferably at least 100 m²/g, but preferably not more than 200 m²/g, and more preferably not more than 130 m²/g. Within the above range, the effects of the invention can be successfully obtained.

The N₂SA of silica is a value measured by the BET method in accordance with ASTM D3037-81.

In the case of a rubber composition for a base tread, the silica content per 100 parts by mass of the rubber component is preferably 10 to 60 parts by mass, and more preferably 25 to 45 parts by mass. Within this range, excellent fuel economy can be obtained.

When the rubber composition of the invention is a rubber composition for a breaker topping, it preferably includes a cobalt salt of an organic acid. Because the role of the organic acid cobalt salt is to form a bridge between cords (steel cords) and rubber, it is capable of increasing adhesion between cords and rubber. Illustrative examples of the organic acid cobalt salt include cobalt stearate, cobalt naphthenate and cobalt boron neodecanoate.

The content of the organic acid cobalt salt, expressed in terms of the amount of cobalt metal, per 100 parts by mass of the rubber component is preferably 0.05 to 0.5 parts by mass, and more preferably 0.05 to 0.3 parts by mass. At less than 0.05 parts by mass, a sufficient adhesion may not be attained, whereas at more than 0.5 parts by mass, the elongation at break tends to decrease.

In cases where the rubber composition of the invention is a rubber composition for a sidewall inner layer-reinforcing layer, in order to obtain good fuel economy, elongation at break, handling stability and durability, it is preferable to include an alkylphenol-sulfur chloride condensate.

Although no particular limitation is imposed on the alkylphenol-sulfur chloride condensate, to achieve the above performances excellently, a compound represented by formula (2) below is preferred.

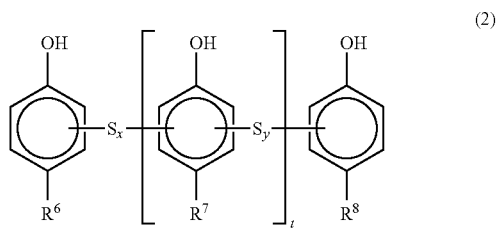

(2)

(In the formula, $R^6$, $R^7$ and $R^6$ may be the same or different and each represent an alkyl group of 4 to 12 carbons; x and y may be the same or different and each represent an integer of 2 to 4; and t is an integer of 0 to 250).

In order for the alkylphenol-sulfur chloride condensate to have a good dispersibility in the rubber component, the letter t is preferably an integer of 0 to 100, and more preferably an integer of 10 to 100. From the standpoint of being able to efficiently achieve a high hardness, the letters x and y are each preferably 2. In order for the alkylphenol-sulfur chloride condensate to have a good dispersibility in the rubber component, $R^6$ to $R^8$ are each preferably an alkyl group having 6 to 9 carbons.

The alkylphenol-sulfur chloride condensate may be exemplified by Tackirol V200, available from Taoka Chemical Co., Ltd. (formula (3) below).

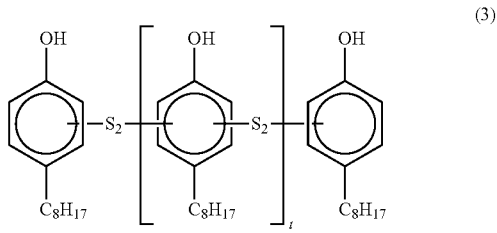

(3)

(In the formula, t is an integer from 0 to 100).

The content of the alkylphenol-sulfur chloride condensate per 100 parts by mass of the rubber component is preferably at least 0.5 parts by mass, and more preferably at least 1 part by mass, but preferably not more than 10 parts by mass, and more preferably not more than 7 parts by mass. Within the above range, good fuel economy, elongation at break, handling stability and durability can be achieved in a balanced manner.

Aside from the above ingredients, compounding ingredients commonly used in the production of rubber compositions, such as various types of antioxidants, waxes, stearic acid, zinc oxide, oils, vulcanizing agents and vulcanization accelerators, may also be appropriately included in the rubber composition of the invention.

In cases where the rubber composition of the invention is a rubber composition for a base tread, in order to sufficiently achieve the effects of the invention, the combined content of oil, the coumarone-indene resin having a softening point of −20° C. to 45° C. and other coumarone-indene resins per 100 parts by mass of the rubber component is preferably 2 to 30 parts by mass, and more preferably 6 to 25 parts by mass.

A known method may be used to prepare the rubber composition of the invention. For example, the rubber composition may be prepared by a method which involves mixing together the various above ingredients using a rubber mixing machine such as an open roll mill or a Banbury mixer, and then vulcanizing the mixture.

The rubber composition of the invention may be suitably used for various tire components; may be more suitably used for tire components other than treads, such as breakers, sidewall-reinforcing layers (sidewall inner layer-reinforcing layers), base treads, sidewalls, clinches, tie gums, bead apexes and strip apexes; and may be particularly preferably used for breakers, sidewall-reinforcing layers, base treads and sidewalls.

The breaker is a tire component which is placed on the inner side of the tread and radially outside of the carcass; this is specifically shown in, for example, FIG. 3 of JP 2003-94918 A. The sidewall-reinforcing layer (sidewall inner layer-reinforcing layer) is a lining strip layer (insert layer) placed on the inner side of the sidewall of a run-flat tire; this is specifically the reinforcing rubber layer shown in, for example, the drawings appended to JP 2004-330822 A. The base tread is, for example, the inner layer of a tread having a two-layer structure.

The pneumatic tire of the invention may be produced by a conventional manufacturing process using the above-described rubber composition. That is, the tire may be produced by extruding and processing the rubber composition at an unvulcanized state according to the shape of a tire component, using a usual method to carry out molding on a tire building machine, assembling the molded component together with other tire components to form an unvulcanized tire, and subjecting the unvulcanized tire to applied heat and pressure in a vulcanizer.

EXAMPLES

The invention is illustrated more concretely below by way of examples, although the examples are not intended to limit the invention.

The various chemicals used in the examples of the invention and the comparative examples are described below.
NR: TSR20
Unmodified SBR: Nipol 1502 (E-SBR; bound styrene content: 23.5% by mass; unmodified), from Zeon Corporation
High-cis BR: VCR617 (SPB-containing BR; SPB content: 17% by mass; SPB melting point: 200° C.; boiling n-hexane insolubles content: 15% to 18% by mass), from Ube Industries, Ltd.
Modified SBR: HPR340 (modified S-SBR; bound styrene content: 10% by mass; Tg: −64° C.; terminally modified with an alkoxysilane by coupling; modified with a compound of formula (1) ($R^1$ to $R^3$=methoxy; $R^4$ and $R^5$=hydrogen atoms; n=3)), from JSR Corporation
Modified BR: BR1250H (tin-modified BR polymerized using a lithium initiator; vinyl content: 10% to 13% by mass; Mw/Mn: 1.5; tin atom content: 250 ppm), from Zeon Corporation
Carbon Black N326: Diablack N326 ($N_2$SA: 84 $m^2$/g; DBP oil absorption: 74 $cm^3$/100 g), from Mitsubishi Chemical Corporation
Carbon Black N550: Shoblack N550 ($N_2$SA: 41 $m^2$/g), from Cabot Japan K.K.
Silica: Z115Gr ($N_2$SA: 115 $m^2$/g), from Rhodia
Silane coupling agent: Si266 (bis(3-triethoxysilylpropyl)disulfide), from Evonik Degussa
Antioxidant 6PPD: Antigene 6C(N-phenyl-N'-(1,3-dimethylbutyl)-p-phenylenediamine), from Sumitomo Chemical Co., Ltd.
Wax: Ozoace 0355, from Nippon Seiro Co., Ltd.
Stearic acid: Tsubaki, from NOF Corporation
Zinc oxide: Zinc oxide No. 2, from Mitsui Mining & Smelting Co., Ltd.
Cobalt stearate: Cost-F (cobalt content: 9.5% by mass), from Dainippon Ink & Chemicals, Inc.
10% oil-containing insoluble sulfur: Seimisulfur (insoluble sulfur containing at least 60% of carbon disulfide insolubles; oil content: 10% by mass), from Nippon Kanryu Industry Co., Ltd.
20% oil-containing insoluble sulfur: Crystex HS OT20 (insoluble sulfur containing 80% by mass of sulfur and 20% by mass of oil), from Flexsys
DCBS: Nocceler DZ (N,N'-dicyclohexyl-2-benzothiazylsulfenamide), from Ouchi Shinko Chemical Industrial Co., Ltd.
TBBS: Nocceler NS (N-tert-butyl-2-benzothiazolylsulfenamide), from Ouchi Shinko Chemical Industrial Co., Ltd.
V200: Tackirol V200 (alkylphenol-sulfur chloride condensate of formula (3) above; sulfur content: 24% by mass), from Taoka Chemical Co., Ltd.
Oil: VivaTec 400 (TDAE oil), from H&R
C5 petroleum resin: Marukarez Resin (C5 petroleum resin; softening point: 100° C.), from Maruzen Petrochemical Co., Ltd.
Resin C10: NOVARES C10 (liquid coumarone-indene resin; softening point: 5 to 15° C.), from Rutgers Chemicals
Resin C30: NOVARES C30 (coumarone-indene resin; softening point: 20 to 30° C.), from Rutgers Chemicals
Resin C80: NOVARES C80 (coumarone-indene resin; softening point: 75 to 85° C.), from Rutgers Chemicals
Resin C100: NOVARES C100 (coumarone-indene resin; softening point: 95 to 105° C.), from Rutgers Chemicals
Resin C120: NOVARES C120 (coumarone-indene resin; softening point: 115 to 125° C.), from Rutgers Chemicals Using a 1.7 L Banbury mixer, the chemicals other than the sulfur and the vulcanization accelerator were mixed according to the formulations shown in Tables 1 to 4. Next, using a roll mill, the sulfur and vulcanization accelerator were added to the resulting kneaded mixture and kneaded therein, giving an unvulcanized rubber composition.

A portion of the unvulcanized rubber composition was press-vulcanized at 170° C. for 12 minutes, thereby giving a vulcanized rubber composition.

Another portion of the unvulcanized rubber composition was used for a breaker, sidewall-reinforcing layer, base tread or sidewall to prepare an unvulcanized tire, and the unvulcanized tire was then vulcanized to produce a test tire (size: 245/40R18).

The resulting unvulcanized rubber compositions, vulcanized rubber compositions and test tires were evaluated as described below. The results are shown in Tables 1 to 4.
Viscoelasticity Test
Using a viscoelasticity spectrometer (VES) from Iwamoto Seisakusho Co., Ltd., the complex elastic modulus E* (MPa) and loss tangent tan δ of the above vulcanized rubber composition were measured at a temperature of 70° C., a frequency of 10 Hz, an initial strain of 10% and a dynamic strain of 2%. A larger E* indicates a higher rigidity and better handling stability. A smaller tan δ indicates less heat build-up and better fuel economy.

Tensile Test

Using No. 3 dumbbell-shaped test pieces made of the vulcanized rubber composition, tensile tests were carried out at room temperature in accordance with JIS K 6251 ("Rubber, vulcanized or thermoplastic—Determination of tensile stress-strain properties"), and the elongation at break EB (%) was measured. A higher EB value indicates a better elongation at break.

Durability: Breaker, Base Tread

The test tire in which the rubber composition was applied to the breaker or base tread was placed in an oven and subjected to 3 weeks of aging at 80° C., following which the tire was run on a drum under 140% overload conditions relative to the maximum load (maximum pneumatic pressure conditions) under JIS standards, and the running distance until deformation (e.g., swelling of the tread) arose was measured. Running distances for the respective formulations are shown as indices relative to a value of 100 for the running distances in Comparative Examples 1 and 15. A larger index indicates better durability.

Durability: Sidewall-Reinforcing Layer

The test tire in which the rubber composition was applied to the sidewall-reinforcing layer was run on a drum at a speed of 80 km/h and an internal air pressure of 0 kPa, and the running distance until the tire broke was measured. Running distances for the respective formulations are shown as indices relative to a value of 100 for the running distance in Comparative Example 9. A larger index indicates better run-flat durability.

Durability: Sidewall

The test tire in which the rubber composition was applied to the sidewall was set to a low internal pressure of 150 kPa (1.5 Bar) relative to JIS standards, and run at 80 km/h under 140% overload conditions, and the running distance until air leakage occurred was measured. Running distances for the respective formulations are shown as indices relative to a value of 100 for the running distance in Comparative Example 21. A larger index indicates better durability.

TABLE 1

(Rubber composition for breaker topping: high sulfur)

| | | Examples | | | | | Comparative Examples | |
|---|---|---|---|---|---|---|---|---|
| | | 1 | 2 | 3 | 4 | 5 | 1 | 2 |
| Formulation (part(s) by mass) | NR | 100 | 100 | 100 | 100 | 100 | 100 | 100 |
| | Unmodified SBR (Nipol 1502) | — | — | — | — | — | — | — |
| | Modified SBR (HPR340) | — | — | — | — | — | — | — |
| | Carbon Black N326 | 60 | 60 | 60 | 60 | 60 | 60 | 60 |
| | Antioxidant 6PPD | 1 | 1 | 1 | 1 | 1 | 1 | 1 |
| | Zinc Oxide | 10 | 10 | 10 | 10 | 10 | 10 | 10 |
| | Cobalt Stearate | 1 | 1 | 1 | 1 | 1 | 1 | 1 |
| | 20% Oil-Containing Insoluble Sulfur (Pure Sulfur Content) | 7 (5.6) | 7 (5.6) | 7 (5.6) | 7 (5.6) | 7 (5.6) | 7 (5.6) | 7 (5.6) |
| | DCBS | 0.8 | 0.8 | 0.8 | 0.8 | 0.8 | 0.8 | 0.8 |
| | C5 Petroleum Resin | — | — | — | — | — | 2 | — |
| | Coumarone-Indene Resin C10 | 2 | — | 6 | 8 | 2 | — | — |
| | Coumarone-Indene Resin C30 | — | 2 | — | — | — | — | — |
| | Coumarone-Indene Resin C80 | — | — | — | — | 2 | — | 2 |
| | Coumarone-Indene Resin C100 | — | — | — | — | — | — | — |
| | Coumarone-Indene Resin C120 | — | — | — | — | — | — | — |
| Evaluation | Handling Stability | 6.22 | 6.24 | 5.81 | 5.42 | 5.95 | 6.25 | 6.35 |
| | Rolling Resistance | 0.129 | 0.13 | 0.122 | 0.119 | 0.126 | 0.142 | 0.15 |
| | Elongation at Break | 490 | 485 | 520 | 570 | 525 | 430 | 475 |
| | Durability Index of Tire | 115 | 112 | 115 | 110 | 115 | 100 | 100 |

| | | Comparative Examples | | | | | |
|---|---|---|---|---|---|---|---|
| | | 3 | 4 | 5 | 6 | 7 | 8 |
| Formulation (part(s) by mass) | NR | 100 | 100 | 100 | 100 | — | — |
| | Unmodified SBR (Nipol 1502) | — | — | — | — | 50 | 50 |
| | Modified SBR (HPR340) | — | — | — | — | 50 | 50 |
| | Carbon Black N326 | 60 | 60 | 60 | 60 | 60 | 60 |
| | Antioxidant 6PPD | 1 | 1 | 1 | 1 | 1 | 1 |
| | Zinc Oxide | 10 | 10 | 10 | 10 | 10 | 10 |
| | Cobalt Stearate | 1 | 1 | 1 | 1 | 1 | 1 |
| | 20% Oil-Containing Insoluble Sulfur (Pure Sulfur Content) | 7 (5.6) | 7 (5.6) | 7 (5.6) | 7 (5.6) | 7 (5.6) | 7 (5.6) |
| | DCBS | 0.8 | 0.8 | 0.8 | 0.8 | 0.8 | 0.8 |
| | C5 Petroleum Resin | — | — | 1.7 | — | 2 | — |
| | Coumarone-Indene Resin C10 | — | — | 0.3 | 22 | — | 2 |
| | Coumarone-Indene Resin C30 | — | — | — | — | — | — |
| | Coumarone-Indene Resin C80 | — | — | — | — | — | — |
| | Coumarone-Indene Resin C100 | 2 | — | — | — | — | — |
| | Coumarone-Indene Resin C120 | — | 2 | — | — | — | — |
| Evaluation | Handling Stability | 6.52 | 6.68 | 6.23 | — | 7.88 | 7.74 |
| | Rolling Resistance | 0.159 | 0.163 | 0.14 | — | 0.161 | 0.157 |
| | Elongation at Break | 465 | 450 | 435 | — | 340 | 355 |
| | Durability Index of Tire | 100 | 95 | 102 | — | 60 | 65 |

TABLE 2

(Rubber composition for sidewall-reinforcing layer: high sulfur)

|  |  | Examples | | | | | | Comparative Examples | | | | | |
|---|---|---|---|---|---|---|---|---|---|---|---|---|---|
|  |  | 6 | 7 | 8 | 9 | 10 | 11 | 9 | 10 | 11 | 12 | 13 | 14 |
| Formulation (part(s) by mass) | Modified SBR (HPR340) | 35 | 35 | 35 | 35 | 35 | 35 | 35 | 35 | 35 | 35 | 35 | 35 |
|  | High-cis BR (VCR617) | 30 | 30 | 30 | 30 | 30 | 30 | 30 | 30 | 30 | 30 | 30 | 30 |
|  | NR | 35 | 35 | 35 | 35 | 35 | 35 | 35 | 35 | 35 | 35 | 35 | 35 |
|  | Carbon Black N550 | 40 | 40 | 40 | 40 | 40 | 40 | 40 | 40 | 40 | 40 | 40 | 40 |
|  | Antioxidant 6PPD | 1 | 1 | 1 | 1 | 1 | 1 | 1 | 1 | 1 | 1 | 1 | 1 |
|  | Stearic Acid | 2 | 2 | 2 | 2 | 2 | 2 | 2 | 2 | 2 | 2 | 2 | 2 |
|  | Zinc Oxide | 5 | 5 | 5 | 5 | 5 | 5 | 5 | 5 | 5 | 5 | 5 | 5 |
|  | 10% Oil-Containing Insoluble Sulfur | 5 | 5 | 5 | 5 | 5 | 5 | 5 | 5 | 5 | 5 | 5 | 5 |
|  | (Pure Sulfur Content) | (4.5) | (4.5) | (4.5) | (4.5) | (4.5) | (4.5) | (4.5) | (4.5) | (4.5) | (4.5) | (4.5) | (4.5) |
|  | TBBS | 2 | 2 | 2 | 2 | 2 | 2 | 2 | 2 | 2 | 2 | 2 | 2 |
|  | V200 | 5 | 5 | 5 | 5 | 5 | 5 | 5 | 5 | 5 | 5 | 5 | 5 |
|  | Oil | 2 | 2 | — | — | — | — | 2 | 2 | 2 | 2 | 3.7 | — |
|  | C5 Petroleum Resin | — | — | — | — | — | — | 2 | — | — | — | — | — |
|  | Coumarone-Indene Resin C10 | 2 | — | 6 | 8 | 18 | 2 | — | — | — | — | 0.3 | 22 |
|  | Coumarone-Indene Resin C30 | — | 2 | — | — | — | — | — | — | — | — | — | — |
|  | Coumarone-Indene Resin C80 | — | — | — | — | — | — | — | 2 | — | — | — | — |
|  | Coumarone-Indene Resin C100 | — | — | — | — | — | — | — | — | — | 2 | — | — |
|  | Coumarone-Indene Resin C120 | — | — | — | — | — | — | — | — | 2 | — | — | — |
| Evaluation | Handling Stability | 8.02 | 8.05 | 7.82 | 7.25 | 6.24 | 7.95 | 7.91 | 8.15 | 8.39 | 8.65 | 7.94 | 5.85 |
|  | Rolling Resistance | 0.047 | 0.048 | 0.042 | 0.04 | 0.042 | 0.043 | 0.051 | 0.055 | 0.06 | 0.068 | 0.05 | 0.047 |
|  | Elongation at Break | 185 | 180 | 210 | 220 | 260 | 230 | 165 | 185 | 185 | 160 | 170 | 285 |
|  | Durability Index of Tire | 110 | 110 | 115 | 120 | 110 | 120 | 100 | 100 | 90 | 70 | 100 | — |

TABLE 3

(Rubber composition for base tread: middle sulfur)

|  |  | Examples | | | | | | Comparative Examples | | | | | |
|---|---|---|---|---|---|---|---|---|---|---|---|---|---|
|  |  | 12 | 13 | 14 | 15 | 16 | 17 | 15 | 16 | 17 | 18 | 19 | 20 |
| Formulation (part(s) by mass) | Modified SBR (HPR340) | 20 | 20 | 20 | 20 | 20 | 20 | 20 | 20 | 20 | 20 | 20 | 20 |
|  | Modified BR (BR1250H) | 20 | 20 | 20 | 20 | 20 | 20 | 20 | 20 | 20 | 20 | 20 | 20 |
|  | NR | 60 | 60 | 60 | 60 | 60 | 60 | 60 | 60 | 60 | 60 | 60 | 60 |
|  | Silica | 35 | 35 | 35 | 35 | 35 | 35 | 35 | 35 | 35 | 35 | 35 | 35 |
|  | Carbon Black N550 | 5 | 5 | 5 | 5 | 5 | 5 | 5 | 5 | 5 | 5 | 5 | 5 |
|  | Silane Coupling Agent | 2.8 | 2.8 | 2.8 | 2.8 | 2.8 | 2.8 | 2.8 | 2.8 | 2.8 | 2.8 | 2.8 | 2.8 |
|  | Wax | 1 | 1 | 1 | 1 | 1 | 1 | 1 | 1 | 1 | 1 | 1 | 1 |
|  | Antioxidant 6PPD | 2 | 2 | 2 | 2 | 2 | 2 | 2 | 2 | 2 | 2 | 2 | 2 |
|  | Stearic Acid | 2 | 2 | 2 | 2 | 2 | 2 | 2 | 2 | 2 | 2 | 2 | 2 |
|  | Zinc Oxide | 10 | 10 | 10 | 10 | 10 | 10 | 10 | 10 | 10 | 10 | 10 | 10 |
|  | 10% Oil-Containing Insoluble Sulfur | 2.67 | 2.67 | 2.67 | 2.67 | 2.67 | 2.67 | 2.67 | 2.67 | 2.67 | 2.67 | 2.67 | 2.67 |
|  | (Pure Sulfur Content) | (2.4) | (2.4) | (2.4) | (2.4) | (2.4) | (2.4) | (2.4) | (2.4) | (2.4) | (2.4) | (2.4) | (2.4) |
|  | TBBS | 1.8 | 1.8 | 1.8 | 1.8 | 1.8 | 1.8 | 1.8 | 1.8 | 1.8 | 1.8 | 1.8 | 1.8 |
|  | Oil | 6 | 6 | 2 | — | — | 4 | 6 | 6 | 6 | 6 | 7.7 | — |
|  | C5 Petroleum Resin | — | — | — | — | — | — | 2 | — | — | — | — | — |
|  | Coumarone-Indene Resin C10 | 2 | — | 6 | 8 | 18 | 2 | — | — | — | — | 0.3 | 22 |
|  | Coumarone-Indene Resin C30 | — | 2 | — | — | — | — | — | — | — | — | — | — |
|  | Coumarone-Indene Resin C80 | — | — | — | — | — | 2 | — | 2 | — | — | — | — |
|  | Coumarone-Indene Resin C100 | — | — | — | — | — | — | — | — | 2 | — | — | — |
|  | Coumarone-Indene Resin C120 | — | — | — | — | — | — | — | — | — | 2 | — | — |

TABLE 3-continued (Rubber composition for base tread: middle sulfur)

| | | Examples | | | | | | Comparative Examples | | | | | |
|---|---|---|---|---|---|---|---|---|---|---|---|---|---|
| | | 12 | 13 | 14 | 15 | 16 | 17 | 15 | 16 | 17 | 18 | 19 | 20 |
| Evaluation | Handling Stability | 3.02 | 3.04 | 3.22 | 3.35 | 2.51 | 3.12 | 3.05 | 3.22 | 3.45 | 3.66 | 3.04 | 2.31 |
| | Rolling Resistance | 0.051 | 0.052 | 0.047 | 0.046 | 0.051 | 0.049 | 0.055 | 0.062 | 0.072 | 0.081 | 0.054 | 0.057 |
| | Elongation at Break | 565 | 565 | 575 | 580 | 610 | 570 | 530 | 550 | 540 | 510 | 535 | 590 |
| | Durability Index of Tire | 110 | 108 | 115 | 120 | 120 | 115 | 100 | 100 | 85 | 75 | 102 | — |

TABLE 4

(Rubber composition for sidewall: low sulfur)

| | | Examples | | | | | | Comparative Examples | | | | | |
|---|---|---|---|---|---|---|---|---|---|---|---|---|---|
| | | 18 | 19 | 20 | 21 | 22 | 23 | 21 | 22 | 23 | 24 | 25 | 26 |
| Formulation (part(s) by mass) | High-cis BR (VCR617) | 60 | 60 | 60 | 60 | 60 | 60 | 60 | 60 | 60 | 60 | 60 | 60 |
| | NR | 40 | 40 | 40 | 40 | 40 | 40 | 40 | 40 | 40 | 40 | 40 | 40 |
| | Carbon Black N550 | 48 | 48 | 48 | 48 | 48 | 48 | 48 | 48 | 48 | 48 | 48 | 48 |
| | Wax | 1.5 | 1.5 | 1.5 | 1.5 | 1.5 | 1.5 | 1.5 | 1.5 | 1.5 | 1.5 | 1.5 | 1.5 |
| | Antioxidant 6PPD | 4 | 4 | 4 | 4 | 4 | 4 | 4 | 4 | 4 | 4 | 4 | 4 |
| | Stearic Acid | 2 | 2 | 2 | 2 | 2 | 2 | 2 | 2 | 2 | 2 | 2 | 2 |
| | Zinc Oxide | 4 | 4 | 4 | 4 | 4 | 4 | 4 | 4 | 4 | 4 | 4 | 4 |
| | 10% Oil-Containing Insoluble Sulfur | 1.7 | 1.7 | 1.7 | 1.7 | 1.7 | 1.7 | 1.7 | 1.7 | 1.7 | 1.7 | 1.7 | 1.7 |
| | (Pure Sulfur Content) | (1.53) | (1.53) | (1.53) | (1.53) | (1.53) | (1.53) | (1.53) | (1.53) | (1.53) | (1.53) | (1.53) | (1.53) |
| | TBBS | 0.7 | 0.7 | 0.7 | 0.7 | 0.7 | 0.7 | 0.7 | 0.7 | 0.7 | 0.7 | 0.7 | 0.7 |
| | Oil | 8 | 8 | 4 | 2 | — | 6 | 8 | 8 | 8 | 8 | 9.7 | — |
| | C5 Petroleum Resin | — | — | — | — | — | — | 2 | — | — | — | — | — |
| | Coumarone-Indene Resin C10 | 2 | — | 6 | 8 | 18 | 2 | — | — | — | — | 0.3 | 22 |
| | Coumarone-Indene Resin C30 | — | 2 | — | — | — | — | — | — | — | — | — | — |
| | Coumarone-Indene Resin C80 | — | — | — | — | — | 2 | — | 2 | — | — | — | — |
| | Coumarone-Indene Resin C100 | — | — | — | — | — | — | — | — | 2 | — | — | — |
| | Coumarone-Indene Resin C120 | — | — | — | — | — | — | — | — | — | 2 | — | — |
| Evaluation | Handling Stability | 3.58 | 3.6 | 3.71 | 3.85 | 3.15 | 3.6 | 3.62 | 3.9 | 4.14 | 4.35 | 3.55 | 2.92 |
| | Rolling Resistance | 0.138 | 0.14 | 0.132 | 0.128 | 0.136 | 0.137 | 0.152 | 0.178 | 0.188 | 0.192 | 0.15 | 0.142 |
| | Elongation at Break | 640 | 620 | 655 | 660 | 720 | 660 | 590 | 620 | 610 | 590 | 595 | 735 |
| | Durability Index of Tire | 110 | 105 | 113 | 115 | 120 | 115 | 100 | 100 | 95 | 90 | 102 | — |

In the examples according to the invention in which coumarone-indene resins (C10, C30) having a softening point of −20° C. to 45° C. were compounded with NR and sulfur, compared with the comparative examples in which a petroleum resin or a coumarone-indene resin having a high softening point was used instead of C10 or C30, improvements in terms of both the elongation at break and the rolling resistance were achieved while maintaining the handling stability. Moreover, the tire durability also increased.

Moreover, when rubber compositions for a clinch, tie gum, bead apex or strip apex were prepared using an isoprene-based rubber (NR, IR, L-IR, epoxidized NR) and either C10 or C30, and other ingredients, these composition also had excellent E*, tan δ and EB values. Furthermore, in test tires in which the compositions were applied to the clinch, tie gum, bead apex and strip apex, respectively, the durability was also excellent.

The invention claimed is:
1. A pneumatic tire comprising a breaker topping, a base tread, a sidewall, a clinch, a tie gum, a bead apex, or a sidewall-reinforcing layer formed from a rubber composition for a tire, said rubber composition comprising:
    a rubber component containing an isoprene-based rubber;
    sulfur;
    carbon black having a nitrogen adsorption specific surface area ($N_2SA$) of not more than 84 $m^2/g$; and
    a coumarone-indene resin having a softening point of −20° C. to 45° C.,
    wherein the coumarone-indene resin is contained in an amount of 0.5 to 6 parts by mass per 100 parts by mass of the rubber component.

2. The pneumatic tire according to claim 1, wherein the sulfur in said rubber composition is contained in an amount of 0.5 to 7 parts by mass per 100 parts by mass of the rubber component.

3. The pneumatic tire according to claim 1, wherein the sulfur in said rubber composition is contained in an amount of 1.3 to 7 parts by mass, per 100 parts by mass of the rubber component.

4. The pneumatic tire according to claim 1, wherein a content of the isoprene-based rubber in 100% by mass of the rubber component in said rubber composition is at least 35% by mass.

* * * * *